(12) United States Patent
Panikkar

(10) Patent No.: US 12,536,042 B2
(45) Date of Patent: Jan. 27, 2026

(54) SYSTEM AND METHOD OF UTILIZING CONTAINERS ON AN INFORMATION HANDLING SYSTEM

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 520 days.

(21) Appl. No.: 17/935,435

(22) Filed: Sep. 26, 2022

(65) Prior Publication Data

US 2024/0103918 A1 Mar. 28, 2024

(51) Int. Cl.
*G06F 9/50* (2006.01)
*G06F 9/455* (2018.01)
*G06F 9/48* (2006.01)

(52) U.S. Cl.
CPC ........ *G06F 9/5016* (2013.01); *G06F 9/45558* (2013.01); *G06F 9/4881* (2013.01); *G06F 9/5077* (2013.01); *G06F 9/5083* (2013.01); *G06F 2009/45583* (2013.01); *G06F 2209/505* (2013.01)

(58) Field of Classification Search
CPC .. G06F 9/5016; G06F 9/45558; G06F 9/4881; G06F 9/5077; G06F 2009/45583; G06F 2209/505; G06F 9/5083
USPC ......................................... 718/102, 104, 105
See application file for complete search history.

(56) References Cited

U.S. PATENT DOCUMENTS

| | | | |
|---|---|---|---|
| 11,843,545 B1* | 12/2023 | Vasamsetti | H04L 47/765 |
| 2018/0225155 A1* | 8/2018 | Watt, Jr. | G06F 9/5083 |
| 2020/0310881 A1* | 10/2020 | Gonzalez | G06F 9/5027 |
| 2022/0353201 A1* | 11/2022 | Navali | H04L 41/5054 |
| 2023/0080300 A1* | 3/2023 | Panikkar | G06F 9/5072 718/105 |
| 2024/0370307 A1* | 11/2024 | You | G06F 9/5072 |

OTHER PUBLICATIONS

Rossi, F. (Feb. 2020). Auto-scaling Policies to Adapt the Application Deployment in Kubernetes. In ZEUS (pp. 30-38). (Year: 2020).*

* cited by examiner

*Primary Examiner* — April Y Blair
*Assistant Examiner* — Justin Che-Chun Tong
(74) *Attorney, Agent, or Firm* — McDermott Will & Schulte LLP

(57) ABSTRACT

In one or more embodiments, one or more systems, one or more methods, and/or one or more processes may: execute a virtual machine; deploy a first calibration multiple pods associated with an application on the virtual machine; for each set of inputs of multiple sets of inputs: determine a processor utilization of the first calibration multiple pods and all additional calibration multiples of pods; and determine a memory utilization of the first calibration multiple pods and all additional calibration multiples pods; and determine a threshold number of pods associated with the application that can be utilized without exceeding a threshold amount of memory based at least on the processor utilization of the first calibration multiple pods and all additional calibration multiples of pods and based at least on the amount of memory allocated to the first calibration multiple pods and all additional calibration multiples of pods.

20 Claims, 11 Drawing Sheets

```
Configuration 250 type:     ContainerResource
              ContainerResource:
                  name: cpu
                  container: application
              target:
                      type: Utilization
                      averageUtilization: 60
```

SYSTEM AND METHOD OF UTILIZING CONTAINERS ON AN INFORMATION HANDLING SYSTEM

BACKGROUND

Field of the Disclosure

This disclosure relates generally to information handling systems and more particularly to utilizing containers on an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute a virtual machine on a physical information handling system; may deploy a first calibration multiple pods associated with an application on the virtual machine, in which each pod of the first calibration multiple pods includes one or more containers associated with the application; for each set of inputs of multiple sets of inputs: may provide the set of calibration inputs to the first calibration multiple pods and all additional calibration multiples of pods associated with the application; may determine a processor utilization of the first calibration multiple pods and all additional calibration multiples of pods; may determine a memory utilization of the first calibration multiple pods and all additional calibration multiples of pods; may store, via a memory medium, the memory utilization of the first calibration multiple pods and all additional calibration multiples of pods; may determine, by a pod autoscaling process, if the memory utilization meets or exceeds a calibration memory utilization threshold; if the memory utilization meets or exceeds the calibration memory utilization threshold: may deploy an additional calibration multiple pods associated with the application on the virtual machine, in which each pod of the additional calibration multiple pods includes one or more containers associated with the application; may determine an amount of memory allocated to the first calibration multiple pods and all additional calibration multiples of pods; and may store, via the memory medium, the amount of memory allocated to the first calibration multiple pods and all additional calibration multiples of pods; and if the memory utilization does not meet or exceed the memory utilization threshold, may perform: determining the amount of memory allocated to the first calibration multiple pods and all additional calibration multiples of pods and the storing, via the memory medium, the amount of memory allocated to the first calibration plurality of pods and all additional calibration pluralities of pods; and may determine a threshold number of pods associated with the application that can be utilized without exceeding a threshold amount of memory based at least on the processor utilization of the first calibration multiple pods and all additional calibration multiples of pods and based at least on the amount of memory allocated to the first calibration multiple pods and all additional calibration multiples of pods.

In one or more embodiments, each of numbers of calibration inputs in the multiple sets of inputs is a positive number and greater than zero. In one or more embodiments, the one or more systems, the one or more methods, and/or the one or more processes may further: deploy a first runtime multiple pods associated with the application on the virtual machine, in which each pod of the first runtime multiple pods includes one or more containers associated with the application; receive, by the first runtime plurality of pods, first multiple runtime inputs; determine, by the pod autoscaling process, a memory utilization of the first multiple pods; determine, by the pod autoscaling process, that the memory utilization of the first multiple pods meets or exceeds a runtime memory utilization threshold; deploy additional runtime multiple pods associated with the application on the virtual machine, in which each pod of the additional runtime multiple pods includes one or more containers associated with the application; determine that the first runtime multiple pods and the additional runtime multiple pods meets or exceeds the threshold number of pods associated with the application that can be utilized without exceeding the threshold of amount of memory; and in response to determining that the first runtime plurality of pods and the additional runtime multiple pods meets or exceeds the threshold number of pods: receive additional multiple runtime inputs; and queue the additional multiple runtime inputs in a queue.

In one or more embodiments, receiving the additional multiple runtime inputs may include receiving, by a resource manager executing on the virtual machine, the additional multiple runtime inputs. For example, queuing the additional multiple runtime inputs in the queue may include queuing, by the resource manager, the additional multiple runtime inputs in the queue. In one or more embodiments, the one or more systems, the one or more methods, and/or the one or more processes may further prevent the pod autoscaling process from deploying any supplemental runtime pod associated with the application. In one or more embodiments, the one or more systems, the one or more methods, and/or the one or more processes may further: determine that the first runtime multiple pods and the additional runtime multiple pods can be scaled down; and terminate at least one runtime pod of the first runtime multiple pods and the additional runtime multiple pods from executing. In one or more embodiments, the one or more systems, the one or more methods, and/or the one or more processes may further: dequeue at least a portion of the additional multiple runtime inputs from the queue; and process, by the first runtime multiple pods, the at least the portion of the additional multiple runtime inputs.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
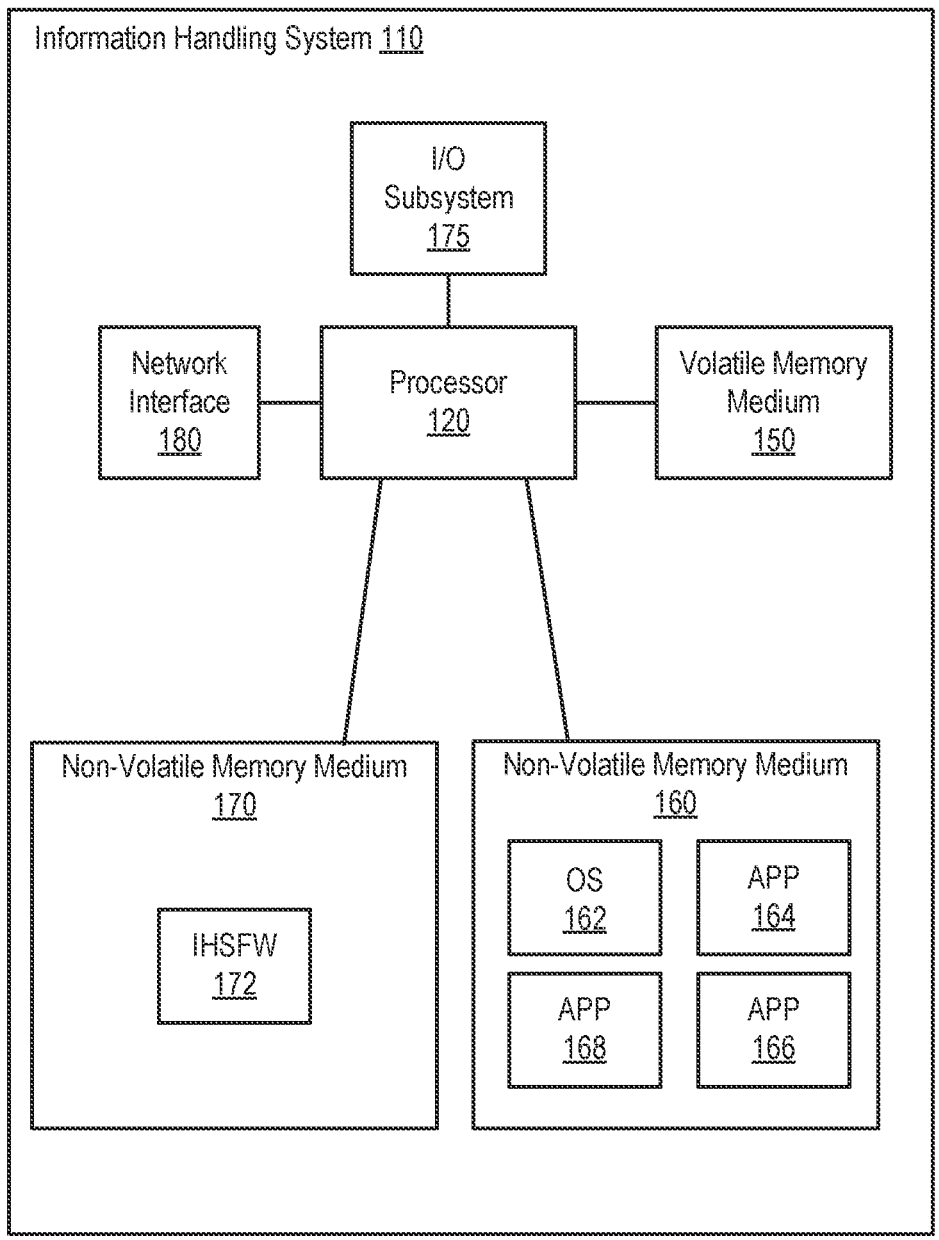
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, multiple containers (e.g., multiple operating system virtualization instances), executing on an information handling system, may access a limited computing resource. In one example, the information handling system may include the limited computing resource. In one instance, the limited computing resource may include a database system, which the information handling system includes. In another instance, the limited computing resource may include a graphics processing unit (GPU), which the information handling system includes. In another example, the information handling system may not include the limited computing resource. For instance, the limited computing resource may include a database system, which may be external to the information handling system. As example, the database system may include one or more other information handling systems. For instance, the information handling system may be communicatively coupled to the database system via a network.

In one or more embodiments, a container may virtualize an operating system (e.g., MICROSOFT® WINDOWS®, LINUX®, NETBSD®, FREEBSD®, OS/2®, OpenBSD, Minix, SOLARIS®, Plan 9, MACOS®, etc.). For example, a container may include an application and libraries and dependencies utilized and/or required by the application. In one or more embodiments, a container may be small, quick, and portable compared with a virtual machine. For example, a container may not need to include a guest operating system in each instance. For instance, a container may utilize and/or leverage features and resources of a host OS. In one or more embodiments, a container may permit developers to improve processor and memory utilization of physical information handling systems and/or virtual machines. For example, a container may enable microservice architectures, where one or more application components can be deployed and scaled more granularly. For instance, application components may process information in parallel and may be scaled up to an entire monolithic application.

In one or more embodiments, a container may include an abstraction at an application layer that packages code and dependencies together. For example, multiple containers may execute on a single information handling system and may share an operating system kernel with other containers, where each container may execute as isolated processes in user space. For instance, a contain may utilize less space than a virtual machine. As an example, a container may handle more applications and require fewer virtual machines and operating systems.

In one or more embodiments, a container may include a unit of software that packages up code and all its dependencies such that an application runs quickly and reliably from one computing environment to another. For example, a container image may include a lightweight, standalone, executable package of software, which may include one or more dependencies to run an application. For instance, the one or more dependencies may include executable code, a runtime environment, system tools, system libraries and settings.

In one or more embodiments, a container image may become a container at runtime. For example, a Docker container may become a container when the Docker container runs on a Docker engine. In one or more embodiments, a container may isolate software from on operating system environment and/or may ensure that the container works uniformly despite differences for instance between a development environment and an execution environment.

In one or more embodiments, a pod may include one or more containers. For example, multiple pods may access a limited computing resource. In one or more embodiments, a pod may receive a request. For example, processing the request may include utilizing the limited computing resource. For instance, an amount of time may transpire while the request is processed utilizing the limited computing resource.

In one or more embodiments, first multiple requests may be received, which may be processed utilizing the limited computing resource. For example, a first amount of time may transpire while a first pod processes the first multiple requests utilizing the limited computing resource. In one or more embodiments, during the first amount of time, second multiple requests may be received, which may be processed utilizing the limited computing resource. For example, a second pod may be created and/or instantiated based at least on receiving the second multiple requests. For instance, a second amount of time may transpire while the second pod waits for access to the limited computing resource and processes the second multiple requests utilizing the limited computing resource.

In one or more embodiments, during the second amount of time, third multiple requests may be received, which may be processed utilizing the limited computing resource. For example, a third pod may be created and/or instantiated based at least on receiving the third multiple requests. For instance, a third amount of time may transpire while the third pod waits for access to the limited computing resource and processes the third multiple requests utilizing the limited computing resource. As an example, an information processing bottleneck may occur because of the limited computing resource.

In one or more embodiments, as additional pods are created and/or instantiated in response to receiving additional requests, other computing resources (e.g., memory, processor, bandwidth of a bus, etc.) of an information handling system may be allocated to the additional pods until the other computing resources are exhausted. For example, if the other computing resources are exhausted one or more issues associated with the information handling system may arise. In one instance, an issue may include slower request processing. In a second instance, an issue may include slower memory system input/output (I/O) due to memory page swapping (e.g., swapping memory pages to and from disk). In another instance, an issue may include a crash of the information handling system. As one example, the information handling system may be a physical information handling system. As another example, the information handling system may be a virtual machine (e.g., a virtual information handling system).

In one or more embodiments, in response to receiving additional requests, a threshold number of pods may be created and/or instantiated. For example, in response to receiving the additional requests, the additional requests may be queued. For instance, the additional requests that were queued may be dequeued and provided to the threshold number of pods. As an example, when the threshold number of pods can process the additional requests, one or more of the additional requests that were queued may be dequeued and provided to the threshold number of pods.

In one or more embodiments, container based deployment (e.g., Kubernetes, Docker, etc.) for computer-based process, service, and/or automation, among others may be utilized. In one example, container based implementation may be utilized for microservice creation and/or implementation. In another example, container based implementation may be utilized for long running computing jobs, transformation of data, processing of data, etc. In one or more embodiments, container methodology may provide benefits for users (e.g., administrators, developers, etc.) with features such as portability and/or pod autoscaling (e.g., a horizontal pod autoscaling), among others. For example, pod autoscaling may add more pods to an information handling system as one or more processing loads increase. In one example, pod autoscaling may provide a developer with an abstraction layer to and infrastructure. In another example, after a point of time, increasing a number of pods may not help scalability or resiliency, in some cases.

In one or more embodiments, an application may be communicatively coupled to a database system. For example, the database system may delay providing information to the application. In one instance, the database system may delay providing information to the application based at least on other information processing that the database system may be performing or may have been performing. In another instance, the database system may delay providing information to the application based at least on the database system entering a wait and/or lock condition due to one or more parallel requests. In one or more embodiments, creating and/or instantiating additional pods may have an adverse effect as a wait time may increase and a memory conception may increase in cluster level and may only make the application unresponsive. In one or more embodiments, other applications running in the cluster. For example, if the number of pods is increased, the pods may access a single computing resource (e.g., the database system) and may enter a bottleneck. For instance, this may vary based at least on a nature of the application and/or based at least one a current computing environment and/or computing resource availability.

In one or more embodiments, a method may determine an optimal number of pods that can be utilized for an application, a computing job, and/or a computing environment, among others. For example, when the method is utilized to determine the optimal number of pods, one or more bottlenecks may be avoided. For instance, a threshold number of pods may be utilized and incoming requests for processing by the pods may be queued. In one or more embodiments, an application may behave differently in different computing environments. In one example, the different computing environments may have one or more different amounts of memory, different available processors, and different I/O speeds, among others. In another example, the different computing environments may have one or more other application executing. In one or more embodiments, the method to determine the optimal number of pods that can be utilized for the application may use a calibration method to determine the optimal number of pods for the application in a specific cluster in a specific computing environment and may apply that to the application to permit the application to run effectively and/or not cause destruction to other applications by allocating too much storage from an overall cluster memory amount.

In one or more embodiments, an administrator and/or a developer may utilize a computing solution as a container image. For example, a container image may include an application code, supporting software, and/or an infrastructure needed to implement the computing solution. For instance, the container may be deployed with high portability of the code. In one or more embodiments, a cluster may have a number of processors, an amount of memory, and others resources based at least on an information handling system utilized. For example, a cluster may be implemented as a virtual machine on a physical information handling system.

In one or more embodiments, a virtual machine (VM) may include an abstraction of physical hardware. For example, virtual machines (VMs) may be utilized to turn a single physical information handling system into multiple virtual information handling systems. For instance, a hypervisor may permit multiple VMs to execute on a single physical information handling system. As an example, a VM may include a full copy of an operating system, one or more applications, and necessary binaries and libraries, among others. In one or more embodiments, a hypervisor may virtualize physical hardware of a physical information handling system. For example, each VM may include a guest operating system, an instance of virtual hardware of a physical information handling system that an application and the guest operating system need to execute, and libraries. For instance, a first guest operating system may be different from a second guest operating system. As an example, the guest operating system and the second guest operating system may execute in respective different VMs on a single physical information handling system. For instance, the first guest operating system may be a MICROSOFT® WINDOWS® operating system, and the second guest operating system may be a NETBSD® operating system.

In one or more embodiments, a container may be configured with a cluster compute resource and one or more amount of computing resources the container may utilize. For example, the container may be deployed in a cluster. In one or more embodiments, after the container is deployed and the computing solution begins being implemented with the container, pods may be created and/or instantiated from the deployed container. For example, the pods may serve incoming requests of the computing solution. In one or more embodiments, a number of pods may increase as a number of parallel requests (e.g., load) increases. For example, increasing the number of pods as the number of parallel requests increase may implement a scalable system (e.g., a horizontally scalable system).

In one or more embodiments, at the time of container deployment, a user (e.g., an administrator, a developer, etc.) may configure a cut off average consumption limit when a new pod should be created and/or instantiated and how many pods (e.g., a replica set). For example, this may be suitable for a microservice based application, where each microservice may be independent from another microservice and may perform a light weight computing task. For instance, a container orchestration system (e.g., Kubernetes) may create and/or instantiate another pod when an average resource utilization of container memory is above a threshold (e.g., sixty percent (60%)).

In one or more embodiments, the container orchestration system may be utilized for long running computing jobs and/or database centric computing jobs. For example, a database system may be outside a container and/or the container orchestration system. In one instance, a container may not include the database system. In another instance, the container may be communicatively coupled to the database system. As an example, the container may be communicatively coupled to the database system via a network communication coupling. For instance, the container may be communicatively coupled to the database system via one or more network sockets. In one or more embodiments, the pods may receive requests. For example, the pods may utilize the database system in processing the requests. For instance, the pods may insert one or more rows in the database system, may update one or more rows in the database system, and/or may delete one or more rows in the database system, among other operations.

In one or more embodiments, an amount of request to be processed at a time may be approximated. For example, the amount of request to be processed at a time may be approximated as one thousand parallel requests at a time. For instance, the requests may include data usage from customer locations to Dell Products, L.P. In one or more embodiments, multiple pods may act as parallel processes. For example, when a number of pods increase, a computing job may execute faster.

In one or more embodiments, if there a resource issue occurs, memory and resource utilization may increase, and one or more new pods may be created and/or instantiated in response to a greater number of requests. For example, the one or more new pods may consume one or more additional computing resources (e.g., memory, processor, etc.). For instance, if one or more additional computing resources are allocated to the one or more new pods, one or more additional pods may be created and/or instantiated in response to resource allocation. As an example, this may affect the application and other applications that share the cluster.

In one or more embodiments, uncontrolled pod autoscaling may not be suitable for resource heavy applications with high load. For example, a cluster may have 1 terabyte (TB) of non-volatile storage (e.g., one or more disk drives) and thirty-two gigabytes (GB) of volatile storage (e.g., random access memory (RAM)). For instance, a first container of an application may be allocated ten GB (10 GB) of non-volatile storage and four GB (4 GB) of volatile storage; a second container of the application may be allocated fifteen GB (15 GB) of non-volatile storage and eight GB (8 GB) of volatile storage; a third container of the application may be allocated 15 GB of non-volatile storage and 8 GB of volatile storage; and a fourth container of the application may be allocated fifteen GB (15 GB) of non-volatile storage and 4 GB of volatile storage. As an example, the second container may have a high load and high database intensive application. For instance, pod autoscaling in the second container may be seventy percent (70%), an initial number of pods may be four, and a pod replica set may be four. The application may be configured to process a maximum of one thousand requests at a time. As a load (e.g., a number of parallel requests) increases, memory consumption of the second container may increase. When the memory allocation of the second container reaches 5.6 GB (e.g., 70% of 8 GB), the pod autoscaling may create and/or instantiate an additional four pods. For example, the container orchestration system may create and/or instantiate the additional four pods in response to the second container reaching 70% utilization of memory allocated to the second container.

In one or more embodiments, the number of requests may increase due to a computing resource bottleneck. For example, a database system may be slow to provide data to the original four pods, which may cause the container orchestration system to create and/or instantiate the additional four pods. For instance, the additional four pods may cause the database system to provide data even slower. As an example, as the container orchestration system creates and/or instantiates even more pods in response to the computing resource bottleneck, available computing resources may be completely utilized, which may cause one or more issues with the second container, other containers in the cluster, the cluster, and/or the information handling system that includes the cluster.

In one or more embodiments, a calibration and throttling system for container based applications may include two modes. For example, the two mode may include a calibration mode and a run mode. In one or more embodiments, a calibration mode may include deploying an application in calibration mode. For example, a maximum number of requests to be processed at a time may be set. For instance, a container may collect resource consumption information and response times of processing requests, beginning with a single request and a single pod and increasing until there is more deviation in the response time and resource consumption (e.g., memory allocation, processor consumption, etc.). As an example, an optimal number of pods may be determined based at least on the collected resource consumption information and response times of processing requests.

In one or more embodiments, in the calibration mode, a container application may be started with a single pod with a pod autoscaling configuration at eighty percent (80%) and a replica set as one (1). For example, a single request may be provided to the container application and requests may be increased in parallel in finite steps. An average processor utilization, an average memory utilization, and an average response time per request may be determined at each increased finite step. After a point in time, the number of pods may increase per the pod autoscaling configuration. In one or more embodiments, a point may be determined where one or more of memory utilization reaches a memory utilization threshold and a response time of request reaches a response time threshold. For example, the number of pods (e.g., an optimal number of pods for the application in a cluster) may be determined before one or more issues arise. In one or more embodiments, the calibration may be repeated and one or more averages may be determined. Example sample calibration data is shown in Table 1.

TABLE 1

Target To Complete 1000 Requests

| Service Onboard | Number of pods | Average Response Time (Sec) | Difference in pods creation on pod autoscaling | Variation % Response Time | Average Memory Usage (%) | Free RAM (Mb) |
|---|---|---|---|---|---|---|
| 1 | 1 | 3.1 | | | 50.3 | 15 |
| 10 | 1 | 3.34 | 0 | 7.18563 | 55.4 | 14.3 |
| 100 | 1 | 4.02 | 0 | 16.9154 | 63.2 | 14.1 |
| 200 | 1 | 4.05 | 0 | 0.74074 | 46.2 | 14.2 |
| 400 | 2 | 4.12 | 1 | 1.69903 | 59.3 | 10.2 |
| 500 | 3 | 4.14 | 1 | 0.48309 | 60.6 | 8.32 |
| 600 | 4 | 4.12 | 1 | −0.4854 | 62.45 | 7.43 |
| 700 | 5 | 4.22 | 1 | 2.36967 | 63.6 | 7.02 |
| 800 | 6 | 5.3 | 1 | 20.3774 | 69.02 | 6.56 |
| 900 | 9 | 9.45 | 3 | 43.9153 | 73.01 | |

As an example, when the load (e.g., number of parallel requests) moves from two hundred (200) to four hundred (400), memory utilization reaches 70%, and the pod autoscaling creates and/or instantiates another pod. Accordingly, average memory is reduced and response time variation keeps less than five percent (5%). When requests reach eight hundred (800), response time variation increases to 20.3774. For instance, one or more resource issues may begin to occur. When the load (e.g., number of parallel requests) reaches nine hundred (900), three pods may be created and/or instantiated. For instance, in the example cluster environment, 900 parallel requests and more than six (6) pods may not be optimal. If an optimistic configuration is applied, six (6) pods may be suggested with eight hundred (800) requests. When a number of pods reaches six (6), a remainder of 200 requests may be queued (e.g., throttled) and processed after once memory is deallocated and the number of pods are automatically scaled down. If a pessimistic configuration is applied, five (5) pods may be suggested with seven hundred (700) requests. When a number of pods reaches five (5), a remainder of 300 requests may be queued (e.g., throttled) and processed after once memory is deallocated and the number of pods are automatically scaled down. For instance, this may be more cautious at an expense of more time to complete processing of the one thousand requests.

In one or more embodiments, the calibration mode may utilize a request manager, a calibrator, and a resource collector, among others. In one example, the request manager may determine a number of requests (e.g., a load). In a second example, the calibrator may permit and/or enable a user (e.g., an administrator, a developer, etc.) to configure a maximum number of requests to be processed and a step of increasing the number of requests (e.g., the load), which may be stored via a database. For instance, the calibrator may utilize the resource collector to collect memory utilization, response time(s), etc., which may be stored via the database. In another example, the resource collector may collect resource consumptions, number of pods, etc. during calibration.

In one or more embodiments, a run mode may include setting a maximum number of pods permitted to run to the optimal number of pods determined and may include queuing additional requests after a number of pods reaches the maximum number of pods permitted to run. For example, the additional requests may be queued after the number of pods reaches the maximum number of pods permitted to run rather than the container orchestration system creating and/or instantiating additional pods. In one or more embodiments, the maximum number of pods permitted to run may receive the requests that were queued. For example, the maximum number of pods permitted to run may process the requests that were queued.

In one or more embodiments, after the calibration is performed, which may suggest an optimal number of pods is determined and an optimal number of parallel requests that can be received, the run mode may be utilized. In one example, the request manager may configure the maximum number of pods created and/or instantiated to the optimal number of pods. In another example, if the number of pods created and/or instantiated has been reached and if the number of requests meets or exceed the maximum number of requests to be processed, a throttler may request that additional request be queued until the number of pods created and/or instantiated is reduced or is automatically scaled down.

In one or more embodiments, a system may calibrate a container application for a cluster or a computing environment for an optimal number of pods to be created in pod autoscaling. For example, the system may calibrate the container application for the cluster or the computing environment for an optimal number of parallel requests that can be processed. In one or more embodiments, a system may configure an optimal pod and an optimal parallel processing system for a container application. For example, the system may throttle and queue additional requests based at least on the optimal number of pods and the optimal number of parallel requests. For example, the system may process queued requests when a number of created and/or instantiated pods is reduced or if an average memory utilization decreases.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
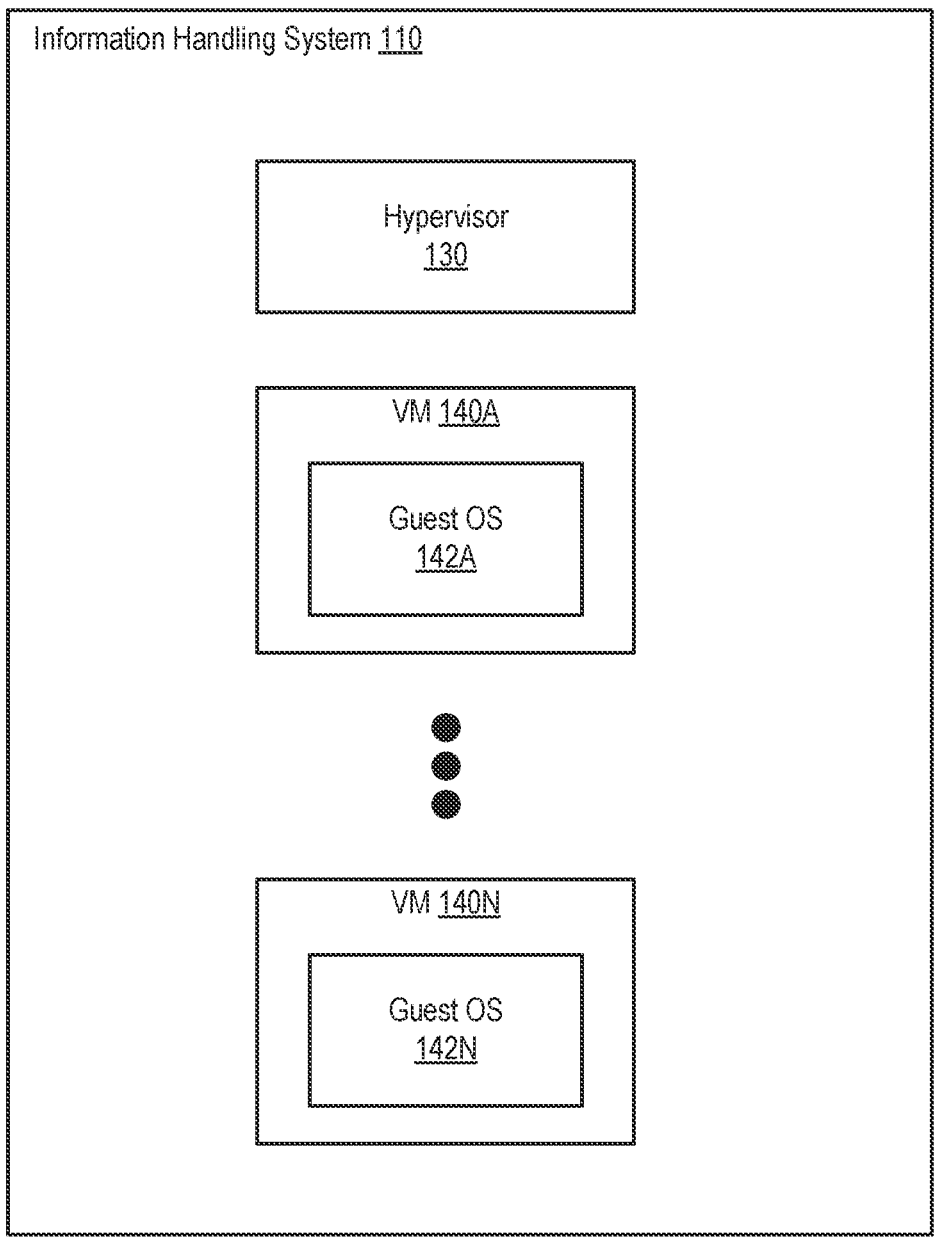
FIG. 1B illustrates an example of an information handling system that includes virtual machines, according to one or more embodiments.

Turning now to FIG. 1B, an example of an information handling system that includes virtual machines is illustrated, according to one or more embodiments. In one or more embodiments, an information handling system may include one or more virtual machines. For example, one or more virtual machines may execute on a physical information handling system. In one or more embodiments, a physical information handling system may include a hypervisor. For example, physical IHS 110 may include a hypervisor 130. For instance, physical IHS 110 may execute hypervisor 130.

In one or more embodiments, a hypervisor may be a virtual machine monitor (VMM), which may include software that creates and runs virtual machines. For example, a hypervisor permits a single physical information handling system to support multiple guest virtual machines by virtually sharing resources of the information handling system.

For instance, the resources of the physical information handling system may include one or more memory media and one or more processors, among others.

In one or more embodiments, a physical information handling system may include one or more virtual machines. For example, physical IHS 110 may include VMs 140A-140N. For instance, physical IHS 110 may execute VMs 140A-140N. Although VMs 140A-140N are illustrated, physical IHS 110 may include and/or may execute any number of VMs 140, according to one or more embodiments.

In one or more embodiments, a virtual machine may include a guest operating system. For example, a VM 140 may include and/or execute a guest OS 142. For instance, VMs 140A-140N may respectively include and/or execute guest operating systems (OSes) 142A-142N. In one or more embodiments, a guest OS 142 may include one or more structures and/or functionalities of those described with reference to OS 162. For example, a guest OS 142 may include MICROSOFT® WINDOWS®, LINUX®, NETBSD®, FREEBSD®, OS/2®, OpenBSD, Minix, SOLARIS®, Plan 9, or MACOS®, among others. In one or more embodiments, a first guest OS may be different from a second guest OS. For example, guest OS 142A may be different from guest OS 142B. For instance, guest OS 142A may be a MICROSOFT® WINDOWS® OS, and guest OS 142B may be a LINUX® OS.

Figures 2A, 2B:
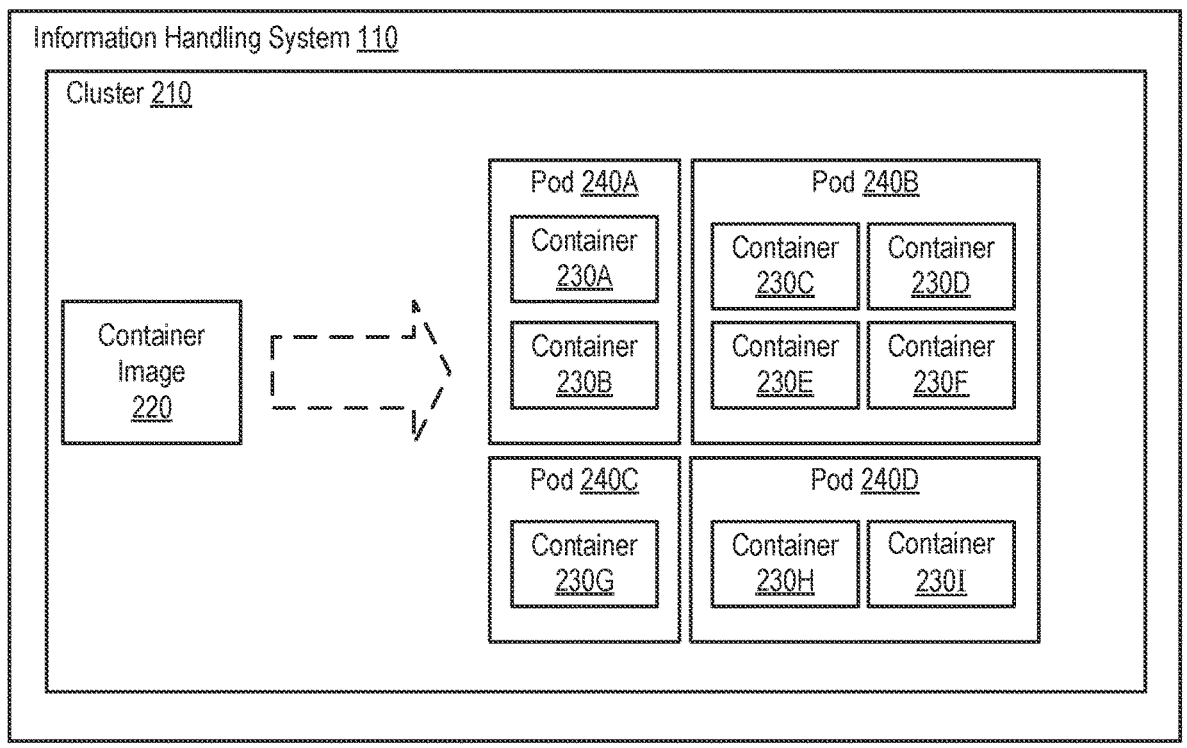
FIG. 2A illustrates an example of an information handling system that includes a cluster, according to one or more embodiments.
FIG. 2B illustrates an example of a configuration of a container, according to one or more embodiments.

Turning now to FIG. 2A, an example of an information handling system that includes a cluster is illustrated, according to one or more embodiments. In one or more embodiments, physical IHS 110 may include a cluster 210. For example, a cluster may be or may include a virtual machine. For instance, cluster 210 may be or may include a virtual machine 140. In one or more embodiments, cluster 210 may include a container image 220. For example, container image 220 may be deployed as a container 230. In one or more embodiments, cluster 210 may include one or more pods 240. As illustrated, cluster 210 may include pods 240A-240D.

In one or more embodiments, a pod 240 may include one or more containers 230. In one example, a pod 240A may include containers 230A and 230B. In a second example, a pod 240B may include containers 230C-230F. In a third example, a pod 240C may include a container 230G. In another example, a pod 240D may include containers 230H and 230I.

Turning now to FIG. 2B, an example of a configuration of a container is illustrated, according to one or more embodiments. As shown, a configuration 250 may include information. In one or more embodiments, the information of configuration 250 may be utilized to deploy one or more pods and/or one or more containers.

Figure 2C:
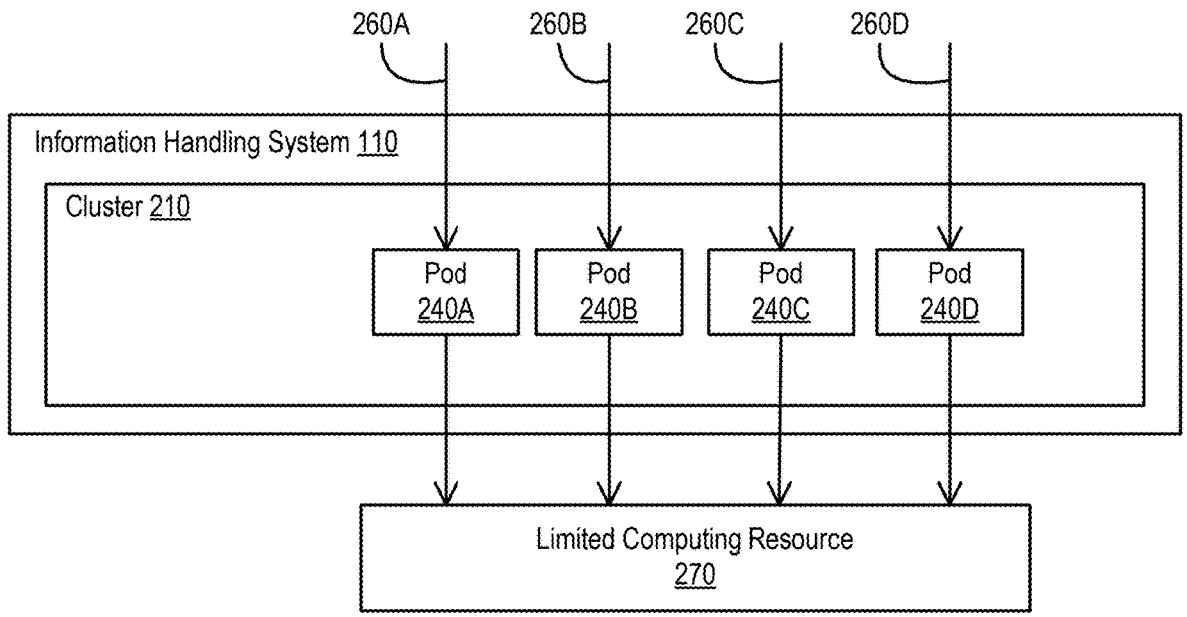
FIG. 2C illustrates another example of an information handling system that includes a cluster, according to one or more embodiments.

Turning now to FIG. 2C, another example of an information handling system that includes a cluster is illustrated, according to one or more embodiments. In one or more embodiments, IHS 110 may receive inputs 260A-260D. For example, cluster 210 may receive inputs 260A-260D. For instance, pods 240A-240D may respectively receive inputs 260A-260D.

In one or more embodiments, one or more pods 240 may access a limited computing resource 270. For example, pods 240A-240D may access limited computing resource 270. In one or more embodiments, limited computing resource 270 may be external to IHS 110. For example, limited computing resource 270 may include another information handling system, different from IHS 110. For instance, the other information handling system may include a database management system. As an example, the database management system may include a relational database management system. As another example, the database management system may include a graph database management system.

Although limited computing resource 270 is illustrated as being external to IHS 110, IHS 110 may include limited computing resource 270, according to one or more embodiments. In one example, limited computing resource 270 may include a GPU. In another example, limited computing resource 270 may be an expansion card. In one instance, the expansion card may include one or more graphics processing units (GPUs). In a second instance, the expansion card may include one or more network interfaces. In another instance, the expansion card may include a host bus adapter (HBA).

In one or more embodiments, IHS 110 may be communicatively coupled to limited computing resource 270. For example, IHS 110 may be communicatively coupled to limited computing resource 270 via a network (not specifically illustrated). In one or more embodiments, the network may include a wired network, a wireless network, an optical network, or a combination of the foregoing, among others. For example, the network may include and/or be coupled to various types of communications networks. For instance, the network may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

Figure 3:
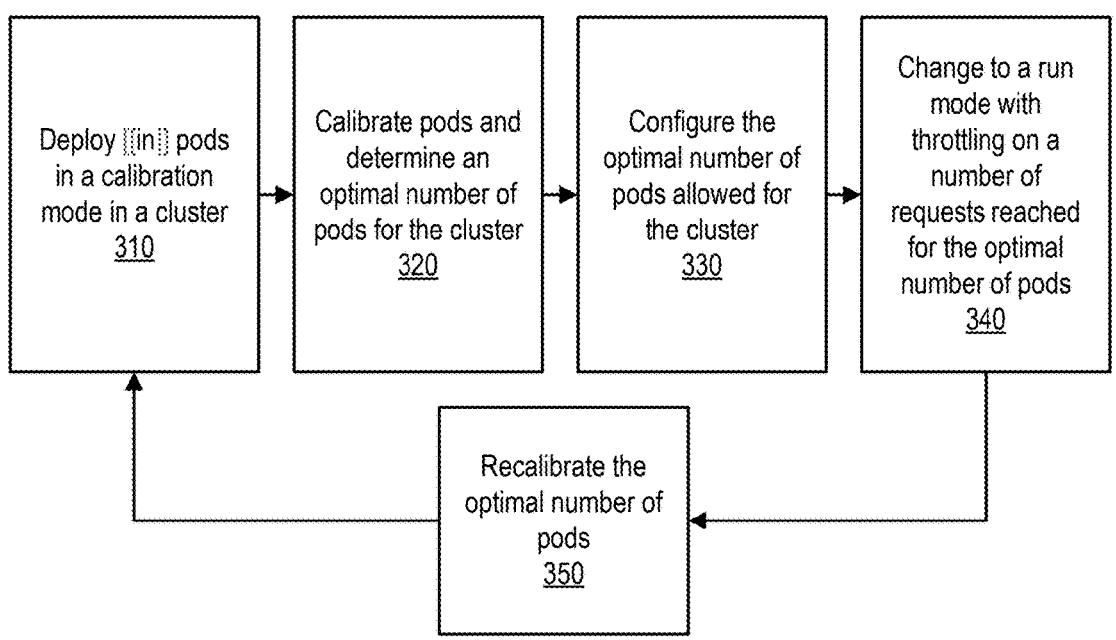
FIG. 3 illustrates an example of a method of utilizing containers on an information handling system, according to one or more embodiments.

Turning now to FIG. 3, an example of a method of utilizing containers on an information handling system is illustrated, according to one or more embodiments. At 310, pods may be deployed in a calibration mode in a cluster. For example, pods 240 may be deployed in a calibration mode in cluster 210. At 320, pods may be calibrated and an optimal number of pods for the cluster may be determined. For example, pods 240 may be calibrated and an optimal number of pods 240 for cluster 210 may be determined.

At 330, the optimal number of pods allowed for the cluster may be configured. For example, cluster 210 may be configured with the optimal number of pods allowed. At 340, a mode may be changed to a run mode with throttling on a number of requests reached for the optimal number of pods. For example, cluster 210 may be changed to a run mode with throttling on a number of requests reached for the optimal number of pods. At 350, the optimal number of pods may be recalibrated. For example, pods may be recalibrated and another optimal number of pods for the cluster. In one or more embodiments, the method may proceed to 310, according to one or more embodiments.

Figure 4A:
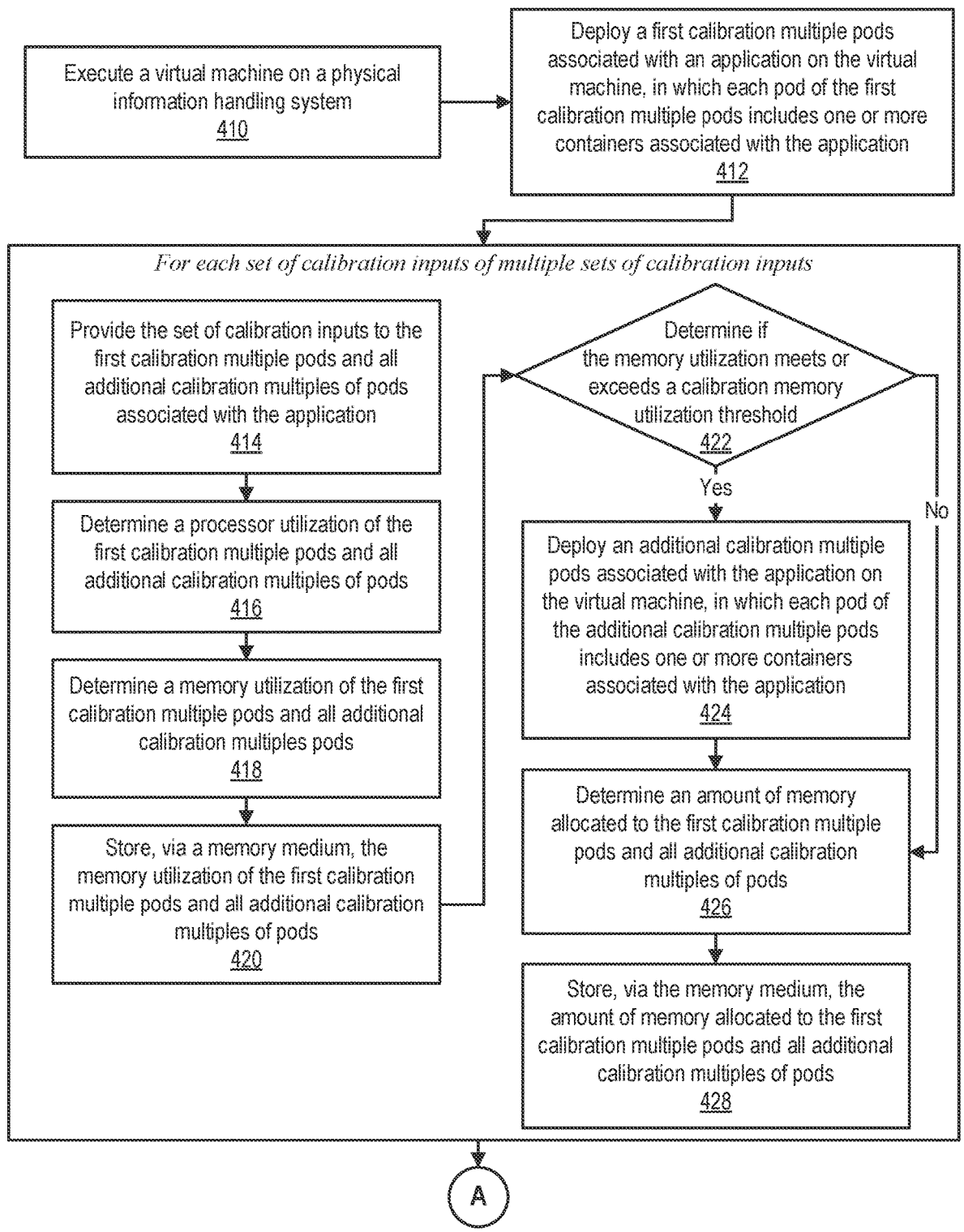
FIGS. 4A-4C illustrate an example of another method of utilizing containers on an information handling system, according to one or more embodiments.
Figure 4B:
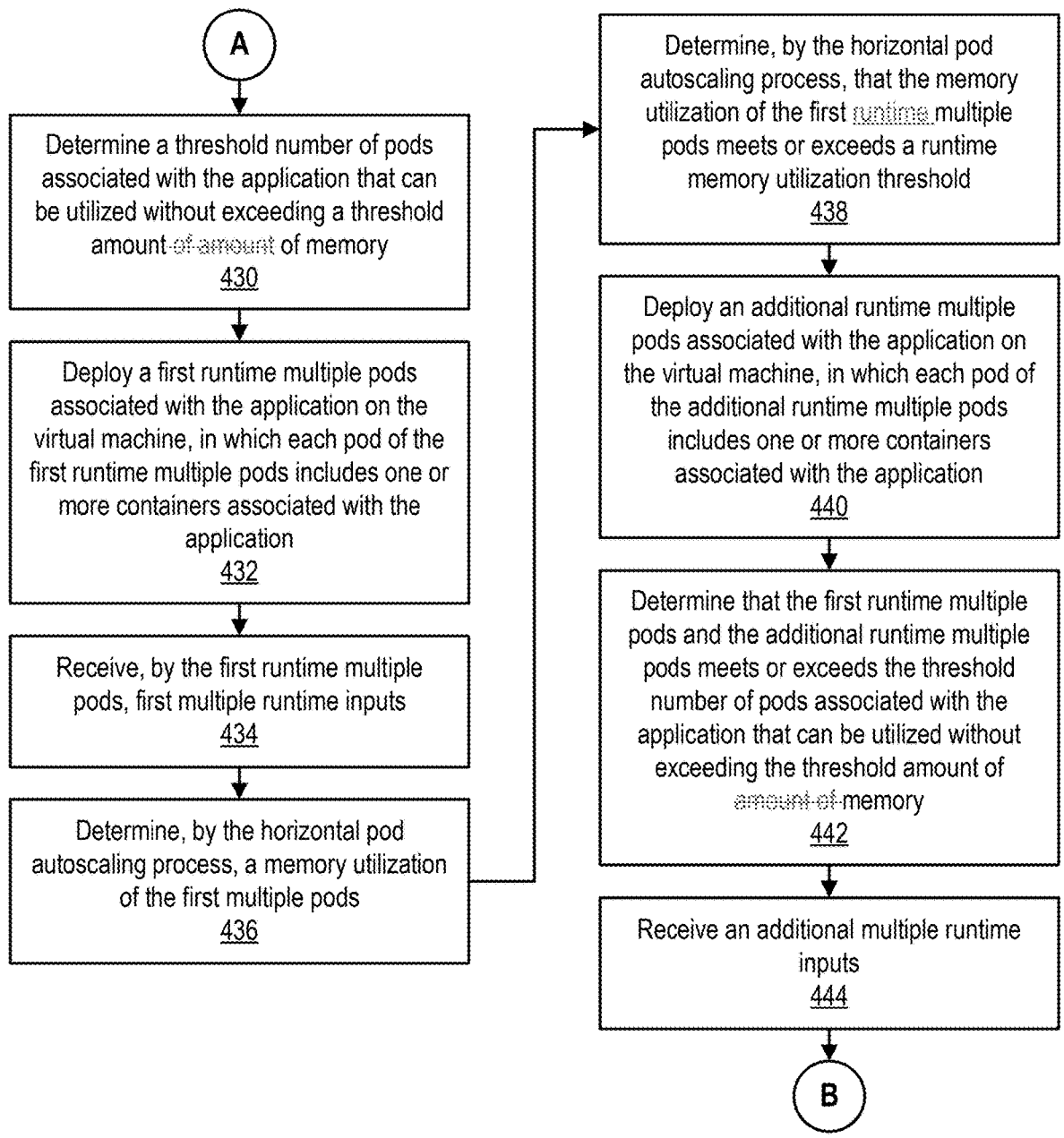
Figure 4C:
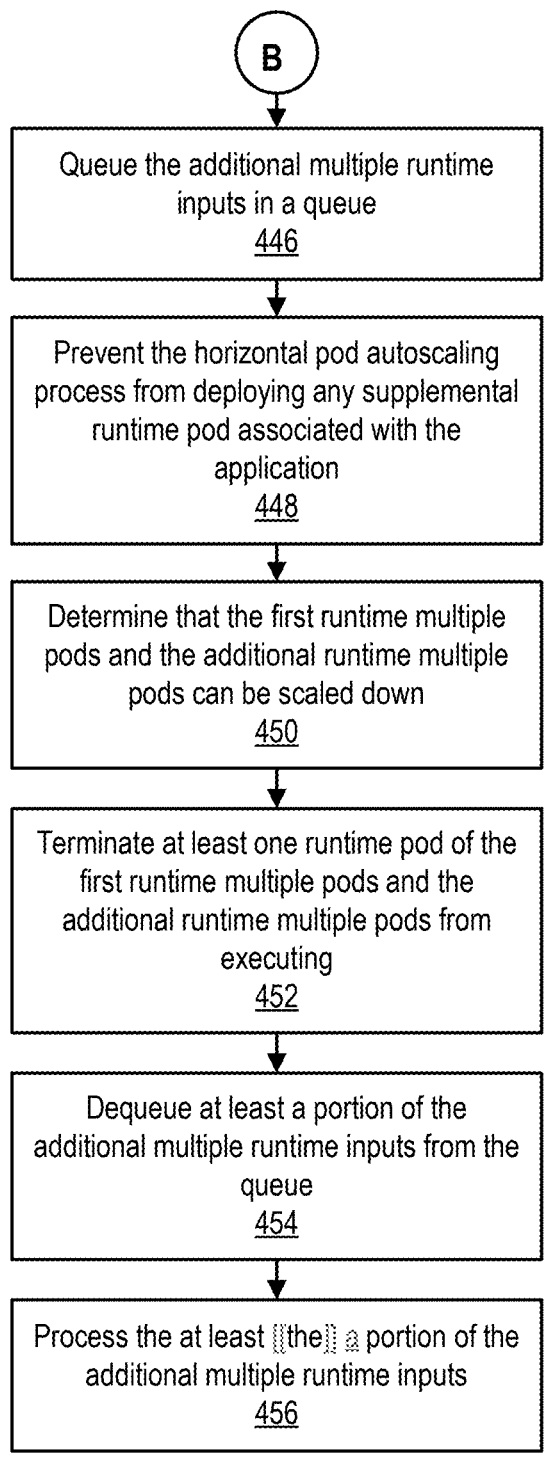

Turning now to FIGS. 4A-4C, an example of another method of utilizing containers on an information handling system is illustrated, according to one or more embodiments. At 410, a virtual machine may execute on a physical information handling system. For example, a VM 140 may execute on physical IHS 110. For instance, cluster 210 may be VM 140. As an example, cluster 210 may be executed on physical IHS 110. At 412, first calibration multiple pods associated with an application may be deployed on the virtual machine, in which each pod of the first calibration multiple pods may include one or more containers associated with the application. For example, each number in the set of calibration inputs in the multiple sets of calibration inputs is a positive number and greater than zero. For instance, pods 240A and 240B may be deployed, as shown in FIG. 5A.

In one or more embodiments, method elements 414-428 may be performed for each set of inputs of multiple sets of calibration inputs. For example, method elements 414-428 may be performed for each set of calibration inputs 550 of multiple sets of calibration inputs 550A-550D. At 414, the set of calibration inputs may be provided to the first calibration multiple pods and all additional calibration multiples of pods associated with the application. For example, the set of calibration inputs 550 may be provided to calibration multiple pods 240A and 240B and all additional calibration multiples of pods 240 associated with the application. In one instance, a request manager 510 may receive the set of calibration inputs 550. In another instance, an ingress load balancer 520 may provide the set of calibration inputs 550 to calibration multiple pods 240A and 240B and all additional calibration multiples of pods 240 associated with the application. As an example, ingress load balancer 520 may be communicatively coupled to request manager 510.

Figure 5A:
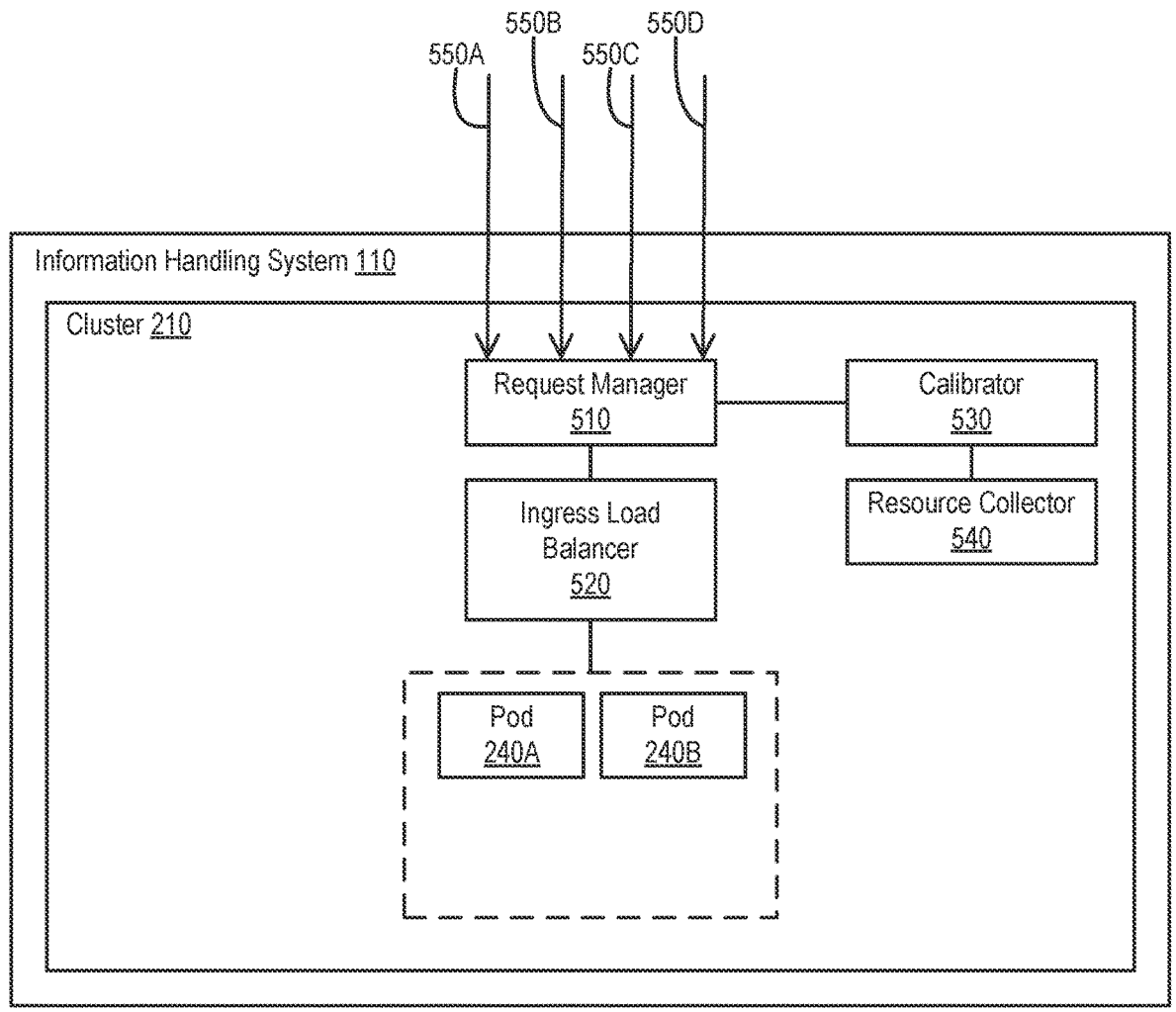
FIG. 5A illustrates an example of an information handling system receiving calibration inputs.

In one or more embodiments, a calibrator 530, illustrated in FIG. 5A, may monitor the set of calibration inputs 550 provided to calibration multiple pods 240A and 240B and all additional calibration multiples of pods 240 associated with the application. For example, calibrator 530 may be communicatively coupled to request manager 510. In one or more embodiments, calibrator 530 may permit a user (e.g., an administrator, a developer, etc.) to configure calibrator 530. For example, the user may set a maximum number of requests to be processed and a number of requests at each step of increasing a load test for calibration. For instance, the maximum number of requests to be processed and the number of requests at each step of increasing the load test for calibration may be stored via a database.

In one or more embodiments, calibrator 530 may utilize a resource collector 540, illustrated in FIG. 5A, to collect memory consumption, memory utilization, an amount of time to process a request, response times, etc. For example, the memory consumption, the memory utilization, the amount of time to process a request, the response times, etc. may be stored via the database. For instance, resource collector 540 may collect resource consumptions, number of pods, etc. during calibration. In one or more embodiments, resource collector 540 may be communicatively coupled with calibrator 530.

At 416, a processor utilization of the first calibration multiple pods and all additional calibration multiples of pods may be determined. For example, a processor utilization of calibration multiple pods 240A and 240B and all additional calibration multiples of pods 240 may be determined. For instance, resource collector 540 may determine the processor utilization of calibration multiple pods 240A and 240B and all additional calibration multiples of pods 240.

At 418, a memory utilization of the first calibration multiple pods and all additional calibration multiples pods may be determined. For example, a memory utilization of calibration multiple pods 240A and 240B and all additional calibration multiples of pods 240 may be determined. For instance, resource collector 540 may determine a memory utilization of calibration multiple pods 240A and 240B and all additional calibration multiples of pods 240.

At 420, the memory utilization of the first calibration multiple pods and all additional calibration multiples of pods may be stored via a memory medium. In one example, the memory utilization of calibration multiple pods 240A and 240B and all additional calibration multiples of pods 240 may be stored via memory medium 150 or memory medium 160, among others. In another example, the memory utilization of calibration multiple pods 240A and 240B and all additional calibration multiples of pods 240 may be stored via a database.

At 422, it may be determined if the memory utilization meets or exceeds a calibration memory utilization threshold. For example, a pod autoscaling process may determine if the memory utilization meets or exceeds a calibration memory utilization threshold. If the memory utilization meets or exceeds the calibration memory utilization threshold, method elements 424-428 may be performed, according to one or more embodiments.

Figure 5B:
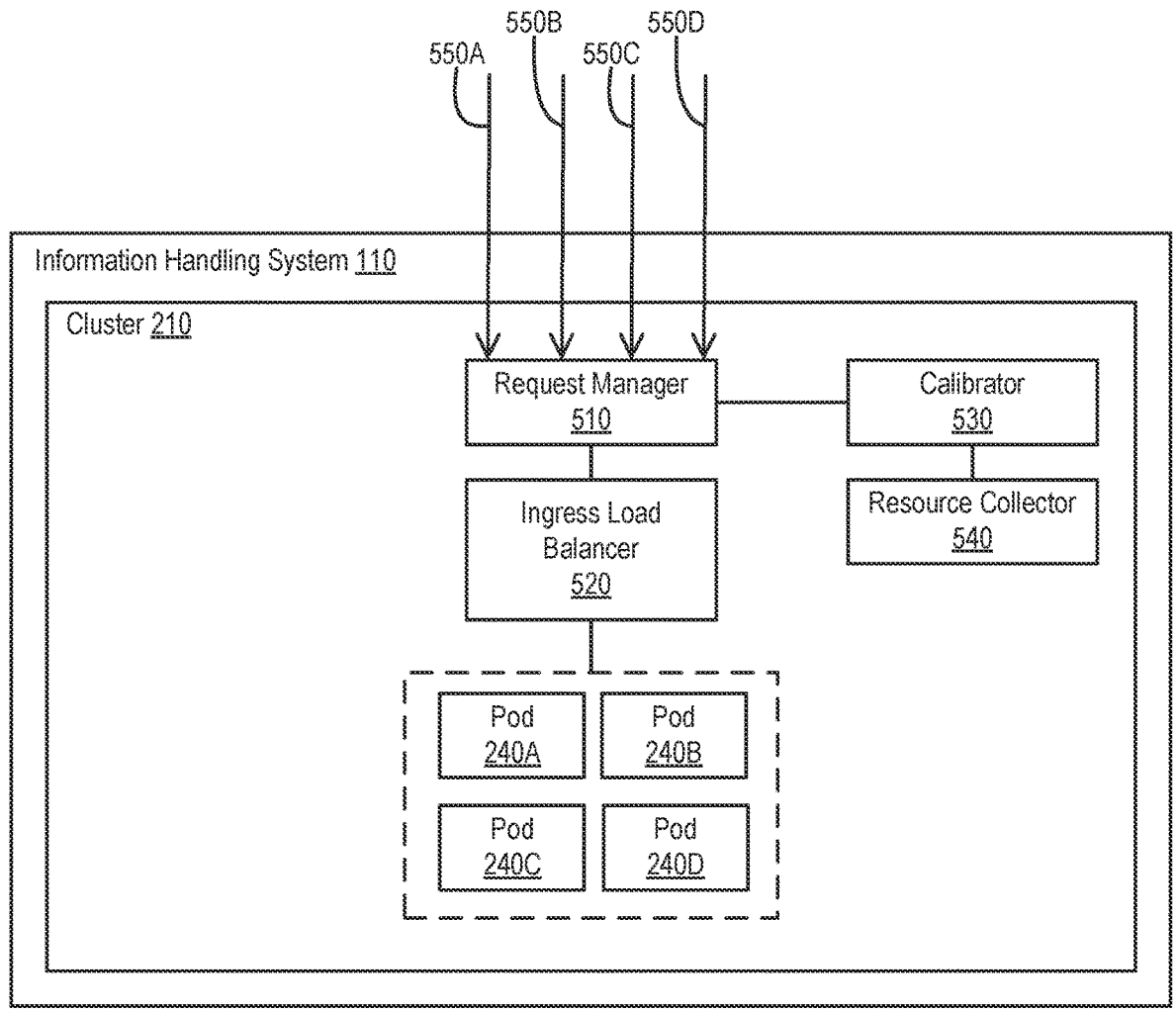
FIG. 5B illustrates another example of an information handling system receiving calibration inputs.

At 424, an additional calibration multiple pods associated with the application on the virtual machine, in which each pod of the additional calibration multiple pods includes one or more containers associated with the application may be deployed. For example, additional calibration multiple pods 240C and 240D may be deployed, as illustrated in FIG. 5B. Although FIG. 5B shows additional calibration multiple pods 240C and 240D, any number of additional calibration multiple pods 240 may be deployed, according to one or more embodiments.

At 426, an amount of memory allocated to the first calibration multiple pods and all additional calibration multiples of pods may be determined. For example, an amount of memory allocated to calibration multiple pods 240A and 240B and all additional calibration multiples of pods 240 may be determined. For instance, if additional calibration multiple pods 240C and 240D have been deployed, an amount of memory allocated to calibration multiple pods 240A and 240B and additional calibration multiple pods 240C and 240D may be determined.

At 428, the amount of memory allocated to the first calibration multiple pods and all additional calibration multiples of pods may be stored. For example, calibrator 530 may store the amount of memory allocated to the first calibration multiple pods and all additional calibration multiples of pods. For instance, calibrator 530 may store the amount of memory allocated to the first calibration multiple pods and all additional calibration multiples of pods via the database.

If the memory utilization does not meet or exceed the memory utilization threshold, method elements 426 and 428 may be performed, according to one or more embodiments. For example, if the memory utilization does not meet or exceed the memory utilization threshold, method element 424 may not be performed, according to one or more embodiments. For instance, if the memory utilization does not meet or exceed the memory utilization threshold, additional calibration multiple pods may not be deployed.

At 430, a threshold number of pods associated with the application that can be utilized without exceeding a threshold amount of memory may be determined. For example, calibrator 530 may determine a threshold number of pods associated with the application that can be utilized without exceeding a threshold amount of memory. In one or more embodiments, the threshold number of pods associated with the application that can be utilized without exceeding the threshold amount of memory may be determined based at least on the processor utilization of the first calibration multiple pods and all additional calibration multiples of pods and based at least on the amount of memory allocated to the first calibration multiple pods and all additional calibration multiples of pods.

Figure 5C:
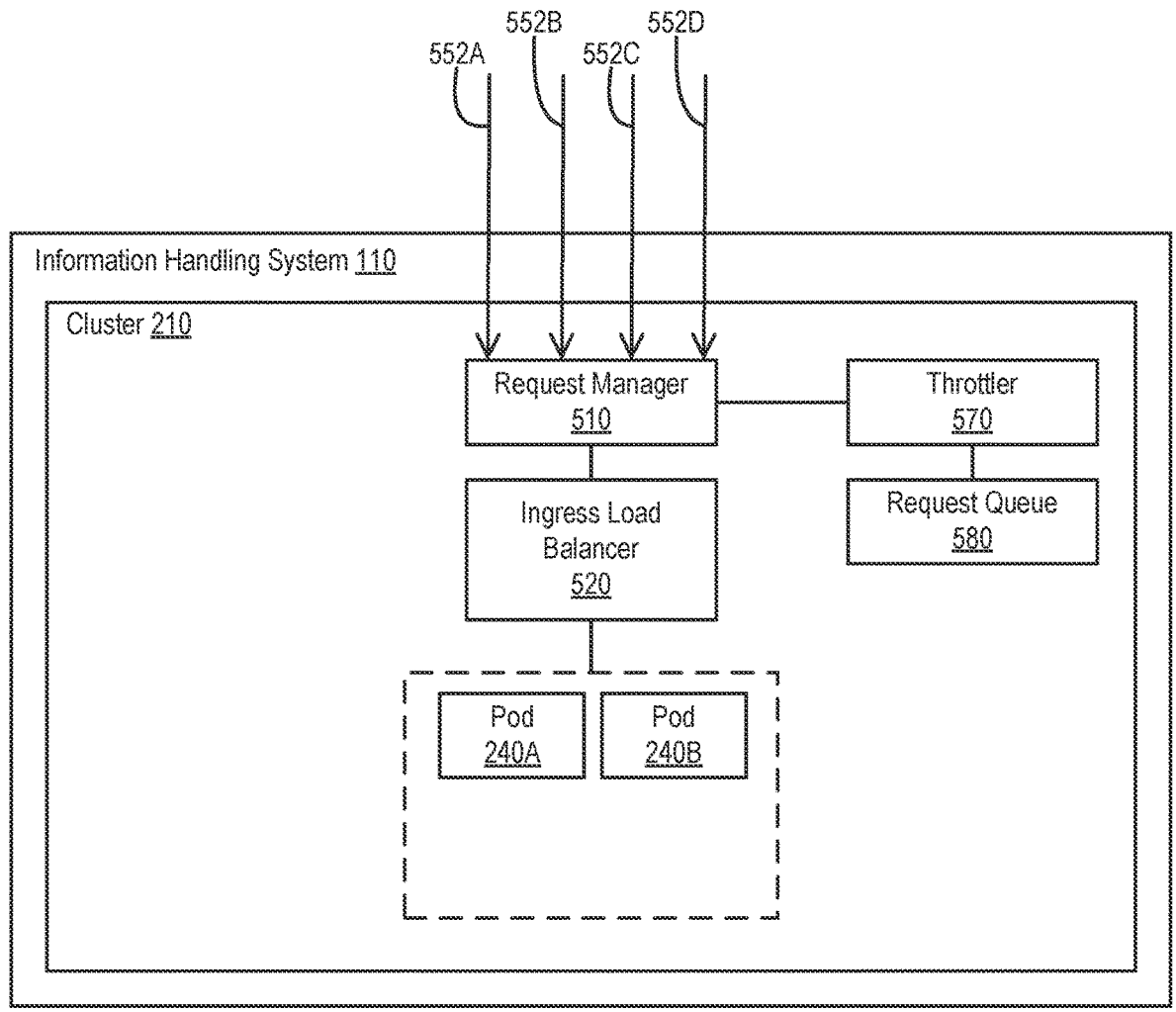
FIG. 5C illustrates an example of an information handling system receiving runtime inputs.

At 432, a first runtime multiple pods associated with the application on the virtual machine, in which each pod of the first runtime multiple pods includes one or more containers associated with the application, may be deployed. For example, pods 240A and 240B may be deployed, as shown in FIG. 5C. At 434, first multiple runtime inputs may be received by the first runtime multiple pods. For example, first multiple runtime inputs 552A may be received by pods 240A and 240B.

In one or more embodiments, request manager 510 may receive the first multiple runtime inputs. For example, request manager 510 may receive first multiple runtime inputs 552A. In one or more embodiments, ingress load balancer 520 may receive the first multiple runtime inputs. For example, ingress load balancer 520 may receive first multiple runtime inputs 552A. For instance, ingress load balancer 520 may receive the first multiple runtime inputs from request manager 510. As an example, ingress load balancer 520 may be communicatively coupled with request manager 510.

At 436, a memory utilization of the first runtime multiple pods may be determined by the pod autoscaling process. At 438, the pod autoscaling process may determine that the memory utilization of the first runtime multiple pods meets or exceeds a runtime memory utilization threshold.

Figure 5D:
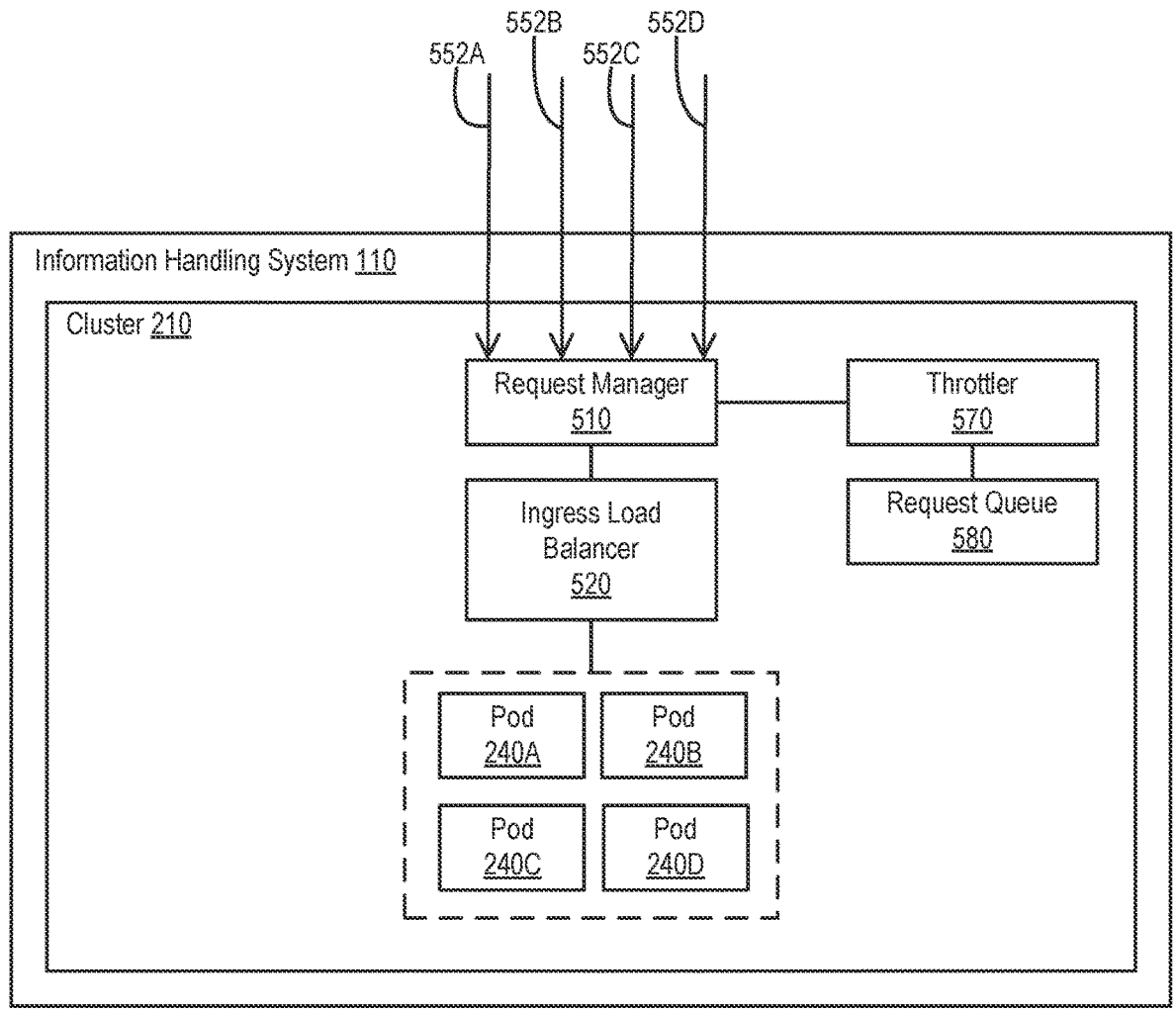
FIG. 5D illustrates another example of an information handling system receiving runtime inputs.

At 440, an additional runtime multiple pods associated with the application on the virtual machine, in which each pod of the additional runtime multiple pods includes one or more containers associated with the application, may be deployed. For example, additional runtime multiple pods 240C and 240D may be deployed, as illustrated in FIG. 5D. Although FIG. 5D shows additional runtime multiple pods 240C and 240D, any number of additional runtime multiple pods 240 may be deployed, according to one or more embodiments.

At 442, it may be determined that the first runtime multiple pods and the additional runtime multiple pods meet or exceed the threshold number of pods associated with the application that can be utilized without exceeding the threshold amount of memory. For example, a throttler 570 may determine that the first runtime multiple pods and the additional runtime multiple pods meet or exceed the threshold number of pods associated with the application that can be utilized without exceeding the threshold amount of memory. In one or more embodiments, throttler 570 may be communicatively coupled with request manager 510. At 444, an additional multiple runtime inputs may be received. For example, a resource manager executing on the virtual machine may receive the additional multiple runtime inputs. For instance, one or more of additional multiple runtime inputs 552B-552D may be received.

At 446, the additional multiple runtime inputs may be queued in a queue. For example, the resource manager may queue the additional multiple runtime inputs in the queue. For instance, request manager 510 may queue the additional multiple runtime inputs in a request queue 580. In one or more embodiments, request queue 580 may be communicatively coupled with throttler 570. In one or more embodiments, receiving the additional multiple runtime inputs and queuing the additional multiple runtime inputs in the queue may be performed in response to determining that the first runtime multiple pods and the additional runtime multiple pods meets or exceeds the threshold number of pods.

At 448, the pod autoscaling process may be prevented from deploying any supplemental runtime pod associated with the application. For example, throttler 570 may prevent the pod autoscaling process from deploying any supplemental runtime pod associated with the application. At 450, it may be determined that the first runtime multiple pods and the additional runtime multiple pods can be scaled down. For example, throttler 570 may determine that the first runtime multiple pods and the additional runtime multiple pods can be scaled down. For instance, throttler 570 may determine that the first runtime multiple pods 240A and 240B and additional runtime multiple pods 240C and 240D can be scaled down.

At 452, at least one runtime pod of the first runtime multiple pods and the additional runtime multiple pods may be terminated from executing. For example, at least one runtime pod of first runtime multiple pods 240A and 240B and additional runtime multiple pods 240C and 240D may be terminated from executing. For instance, throttler 570 may terminate at least one runtime pod of first runtime multiple pods 240A and 240B and additional runtime multiple pods 240C and 240D from executing.

At 454, at least a portion of the additional multiple runtime inputs may be dequeued from the queue. For example, at least a portion of the additional multiple runtime inputs may be dequeued from request queue 580. For instance, throttler 570 may dequeued at least a portion of the additional multiple runtime inputs from request queue 580.

At 456, the at least a portion of the additional multiple runtime inputs may be processed. For example, the first runtime multiple pods may process the at least a portion of the additional multiple runtime inputs. For instance, first runtime multiple pods 240A and 240B may process the at least a portion of the additional multiple runtime inputs. For instance, first runtime multiple pods 240A and 240B may process the at least a portion of the additional multiple runtime inputs, which were dequeued from request queue 580.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A physical information handling system, comprising:
   at least one processor; and
   a memory medium, coupled to the at least one processor, that stores instructions executable by the at least one processor, which when executed by the at least one processor, cause the physical information handling system to:

execute a virtual machine on the physical information handling system;

deploy a first calibration plurality of pods associated with an application on the virtual machine, wherein each pod of the first calibration plurality of pods includes one or more containers associated with the application;

for each set of inputs of a plurality of sets of inputs:
provide the set of calibration inputs to the first calibration plurality of pods and all additional calibration pluralities of pods associated with the application;
determine a processor utilization of the first calibration plurality of pods and all additional calibration pluralities of pods;
determine a memory utilization of the first calibration plurality of pods and all additional calibration pluralities of pods;
store, via the memory medium, the memory utilization of the first calibration plurality of pods and all additional calibration pluralities of pods;
determine, by a pod autoscaling process, if the memory utilization meets or exceeds a calibration memory utilization threshold;
determine the memory utilization meets or exceeds the calibration memory utilization threshold:
deploy an additional calibration plurality of pods associated with the application on the virtual machine, wherein each pod of the additional calibration plurality of pods includes one or more containers associated with the application;
determine an amount of memory allocated to the first calibration plurality of pods and all additional calibration pluralities of pods; and
store, via the memory medium, the amount of memory allocated to the first calibration plurality of pods and all additional calibration pluralities of pods; and
determine the memory utilization does not meet or exceed the calibration memory utilization threshold, perform:
determining the amount of memory allocated to the first calibration plurality of pods and all additional calibration pluralities of pods and storing, via the memory medium, the amount of memory allocated to the first calibration plurality of pods and all additional calibration pluralities of pods; and
iteratively increase a number of pods associated with the application until there is an increase in deviation in response time to the set of calibration inputs and resource consumption of the memory compared to the previous number of pods to determine a threshold number of pods associated with the application that can be utilized without exceeding a threshold amount of memory based at least on the processor utilization of the first calibration plurality of pods and all additional calibration pluralities of pods and based at least on the amount of memory allocated to the first calibration plurality of pods and all additional calibration pluralities of pods, wherein the threshold number of pods is a maximum number of pods that are able to access the memory at a time without decreasing the processor utilization and resulting in a crash of the physical information handling system;

deploy a first runtime plurality of pods associated with the application on the virtual machine based on the threshold number of pods to avoid processing bottlenecks at the physical information handling system, wherein each pod of the first runtime plurality of pods includes one or more containers associated with the application; and process a request utilizing one or more of the first runtime plurality of pods at limited computing resources based on avoiding the processing bottlenecks at the physical information handling system.

2. The physical information handling system of claim 1, wherein each number in the set of calibration inputs in the plurality of sets of inputs is a positive number and greater than zero.

3. The physical information handling system of claim 1, wherein the instructions further cause the physical information handling system to:
receive, by the first runtime plurality of pods, a first plurality of runtime inputs;
determine, by the pod autoscaling process, a memory utilization of the first runtime plurality of pods;
determine, by the pod autoscaling process, that the memory utilization of the first runtime plurality of pods meets or exceeds a runtime memory utilization threshold;
deploy an additional runtime plurality of pods associated with the application on the virtual machine, wherein each pod of the additional runtime plurality of pods includes one or more containers associated with the application;
determine that the first runtime plurality of pods and the additional runtime plurality of pods meets or exceeds the threshold number of pods associated with the application that can be utilized without exceeding the threshold amount of memory; and
in response to determining that the first runtime plurality of pods and the additional runtime plurality of pods meets or exceeds the threshold number of pods:
receive an additional plurality of runtime inputs; and
queue the additional plurality of runtime inputs in a queue.

4. The physical information handling system of claim 3, wherein, to receive the additional plurality of runtime inputs, the instructions further cause the physical information handling system to receive, by a resource manager executing on the virtual machine, the additional plurality of runtime inputs; and
wherein, to queue the additional plurality of runtime inputs in the queue, the instructions further cause the physical information handling system to queue, by the resource manager, the additional plurality of runtime inputs in the queue.

5. The physical information handling system of claim 3, wherein the instructions further cause the physical information handling system to:
prevent the pod autoscaling process from deploying any supplemental runtime pod associated with the application.

6. The physical information handling system of claim 5, wherein the instructions further cause the physical information handling system to:

determine that the first runtime plurality of pods and the additional runtime plurality of pods can be scaled down; and terminate at least one runtime pod of the first runtime plurality of pods and the additional runtime plurality of pods from executing.

7. The physical information handling system of claim 6, wherein the instructions further cause the physical information handling system to:

dequeue at least a portion of the additional plurality of runtime inputs from the queue; and process, by the first runtime plurality of pods, the at least a portion of the additional plurality of runtime inputs.

8. A method, comprising:

executing a virtual machine on a physical information handling system;

deploying a first calibration plurality of pods associated with an application on the virtual machine, wherein each pod of the first calibration plurality of pods includes one or more containers associated with the application;

for each set of inputs of a plurality of sets of inputs:
providing the set of calibration inputs to the first calibration plurality of pods and all additional calibration pluralities of pods associated with the application;

determining a processor utilization of the first calibration plurality of pods and all additional calibration pluralities of pods;

determining a memory utilization of the first calibration plurality of pods and all additional calibration pluralities of pods;

storing, via a memory medium, the memory utilization of the first calibration plurality of pods and all additional calibration pluralities of pods;

determining, by a pod autoscaling process, if the memory utilization meets or exceeds a calibration memory utilization threshold;

determine the memory utilization meets or exceeds the calibration memory utilization threshold:
deploying an additional calibration plurality of pods associated with the application on the virtual machine, wherein each pod of the additional calibration plurality of pods includes one or more containers associated with the application;

determining an amount of memory allocated to the first calibration plurality of pods and all additional calibration pluralities of pods; and storing, via the memory medium, the amount of memory allocated to the first calibration plurality of pods and all additional calibration pluralities of pods; and determine the memory utilization does not meet or exceed the calibration memory utilization threshold, performing:

determining the amount of memory allocated to the first calibration plurality of pods and all additional calibration pluralities of pods and storing, via the memory medium, the amount of memory allocated to the first calibration plurality of pods and all additional calibration pluralities of pods; and iteratively increase a number of pods associated with the application until there is an increase in deviation in response time to the set of calibration inputs and resource consumption of the memory compared to the previous number of pods to determine a threshold number of pods associated with the application that can be utilized without exceeding a threshold amount of memory based at least on the processor utilization of the first calibration plurality of pods and all additional calibration pluralities of pods and based at least on the amount of memory allocated to the first calibration plurality of pods and all additional calibration pluralities of pods, wherein the threshold number of pods is a maximum number of pods that are able to access the memory at a time without decreasing the processor utilization and resulting in a crash of the physical information handling system, deploy a first runtime plurality of pods associated with the application on the virtual machine based on the threshold number of pods to avoid processing bottlenecks at the physical information handling system, wherein each pod of the first runtime plurality of pods includes one or more containers associated with the application; and process a request utilizing one or more of the first runtime plurality of pods at limited computing resources based on avoiding the processing bottlenecks at the physical information handling system.

9. The method of claim 8, wherein each number in the set of calibration inputs in the plurality of sets of inputs is a positive number and greater than zero.

10. The method of claim 8, further comprising:

receiving, by the first runtime plurality of pods, a first plurality of runtime inputs;

determining, by the pod autoscaling process, a memory utilization of the first runtime plurality of pods;

determining, by the pod autoscaling process, that the memory utilization of the first runtime plurality of pods meets or exceeds a runtime memory utilization threshold;

deploying an additional runtime plurality of pods associated with the application on the virtual machine, wherein each pod of the additional runtime plurality of pods includes one or more containers associated with the application;

determining that the first runtime plurality of pods and the additional runtime plurality of pods meets or exceeds the threshold number of pods associated with the application that can be utilized without exceeding the threshold amount of memory; and in response to the determining that the first runtime plurality of pods and the additional runtime plurality of pods meets or exceeds the threshold number of pods:
receiving an additional plurality of runtime inputs; and
queuing the additional plurality of runtime inputs in a queue.

11. The method of claim 10, wherein the receiving the additional plurality of runtime inputs includes receiving, by a resource manager executing on the virtual machine, the additional plurality of runtime inputs; and wherein the queuing the additional plurality of runtime inputs in the queue includes queuing, by the resource manager, the additional plurality of runtime inputs in the queue.

12. The method of claim 10, further comprising:

preventing the pod autoscaling process from deploying any supplemental runtime pod associated with the application.

13. The method of claim 12, further comprising:
determining that the first runtime plurality of pods and the additional runtime plurality of pods can be scaled down; and
terminating at least one runtime pod of the first runtime plurality of pods and the additional runtime plurality of pods from executing.

14. The method of claim 13, further comprising:
dequeuing at least a portion of the additional plurality of runtime inputs from the queue; and
processing, by the first runtime plurality of pods, the at least a portion of the additional plurality of runtime inputs.

15. A computer-readable non-transitory memory medium that includes instructions that, when executed by at least one processor of a physical information handling system, cause the physical information handling system to:
execute a virtual machine on the physical information handling system;
deploy a first calibration plurality of pods associated with an application on the virtual machine, wherein each pod of the first calibration plurality of pods includes one or more containers associated with the application;
for each set of inputs of a plurality of sets of inputs:
provide the set of calibration inputs to the first calibration plurality of pods and all additional calibration pluralities of pods associated with the application;
determine a processor utilization of the first calibration plurality of pods and all additional calibration pluralities of pods;
determine a memory utilization of the first calibration plurality of pods and all additional calibration pluralities of pods;
store, via the memory medium, the memory utilization of the first calibration plurality of pods and all additional calibration pluralities of pods;
determine, by a pod autoscaling process, if the memory utilization meets or exceeds a calibration memory utilization threshold;
determine the memory utilization meets or exceeds the calibration memory utilization threshold:
deploy an additional calibration plurality of pods associated with the application on the virtual machine, wherein each pod of the additional calibration plurality of pods includes one or more containers associated with the application;
determine an amount of memory allocated to the first calibration plurality of pods and all additional calibration pluralities of pods; and
store, via the memory medium, the amount of memory allocated to the first calibration plurality of pods and all additional calibration pluralities of pods; and
determine the memory utilization does not meet or exceed the calibration memory utilization threshold, perform:
determining the amount of memory allocated to the first calibration plurality of pods and all additional calibration pluralities of pods and storing, via the memory medium, the amount of memory allocated to the first calibration plurality of pods and all additional calibration pluralities of pods; and
iteratively increase a number of pods associated with the application until there is an increase in deviation in response time to the set of calibration inputs and resource consumption of the memory compared to the previous number of pods to determine a threshold number of pods associated with the application that can be utilized without exceeding a threshold amount of memory based at least on the processor utilization of the first calibration plurality of pods and all additional calibration pluralities of pods and based at least on the amount of memory allocated to the first calibration plurality of pods and all additional calibration pluralities of pods, wherein the threshold number of pods is a maximum number of pods that are able to access the memory at a time without decreasing the processor utilization and resulting in a crash of the physical information handling system;
deploy a first runtime plurality of pods associated with the application on the virtual machine based on the threshold number of pods to avoid processing bottlenecks at the physical information handling system, wherein each pod of the first runtime plurality of pods includes one or more containers associated with the application; and
process a request utilizing one or more of the first runtime plurality of pods at limited computing resources based on avoiding the processing bottlenecks at the physical information handling system.

16. The computer-readable non-transitory memory medium of claim 15, wherein each number in the set of calibration inputs in the plurality of sets of inputs is a positive number and greater than zero.

17. The computer-readable non-transitory memory medium of claim 15, wherein the instructions further cause the physical information handling system to:
receive, by the first runtime plurality of pods, a first plurality of runtime inputs;
determine, by the pod autoscaling process, a memory utilization of the first runtime plurality of pods;
determine, by the pod autoscaling process, that the memory utilization of the first runtime plurality of pods meets or exceeds a runtime memory utilization threshold;
deploy an additional runtime plurality of pods associated with the application on the virtual machine, wherein each pod of the additional runtime plurality of pods includes one or more containers associated with the application;
determine that the first runtime plurality of pods and the additional runtime plurality of pods meets or exceeds the threshold number of pods associated with the application that can be utilized without exceeding the threshold amount of memory; and
in response to determining that the first runtime plurality of pods and the additional runtime plurality of pods meets or exceeds the threshold number of pods:
receive an additional plurality of runtime inputs; and
queue the additional plurality of runtime inputs in a queue.

18. The computer-readable non-transitory memory medium of claim 17,
wherein, to receive the additional plurality of runtime inputs, the instructions further cause the physical information handling system to receive, by a resource manager executing on the virtual machine, the additional plurality of runtime inputs; and
wherein, to queue the additional plurality of runtime inputs in the queue, the instructions further cause the physical information handling system to queue, by the resource manager, the additional plurality of runtime inputs in the queue.

19. The computer-readable non-transitory memory medium of claim 17, wherein the instructions further cause the physical information handling system to:
prevent the pod autoscaling process from deploying any supplemental runtime pod associated with the application.

20. The computer-readable non-transitory memory medium of claim 19, wherein the instructions further cause the physical information handling system to:
determine that the first runtime plurality of pods and the additional runtime plurality of pods can be scaled down;
terminate at least one runtime pod of the first runtime plurality of pods and the additional runtime plurality of pods from executing;
dequeue at least a portion of the additional plurality of runtime inputs from the queue; and
process, by the first runtime plurality of pods, the at least a portion of the additional plurality of runtime inputs.

* * * * *